(12) United States Patent
Birenheide

(10) Patent No.: US 11,577,638 B2
(45) Date of Patent: Feb. 14, 2023

(54) LOCKING BAR FOR ARRANGEMENT IN ONE LOAD SPACE OF A VEHICLE

(71) Applicant: WISTRA GmbH CARGO CONTROL, Selmsdorf (DE)

(72) Inventor: Christian Birenheide, Berkenthin (DE)

(73) Assignee: WISTRA GmbH CARGO CONTROL, Selmsdorf (DE)

( * ) Notice: Subject to any disclaimer, the term of this patent is extended or adjusted under 35 U.S.C. 154(b) by 238 days.

(21) Appl. No.: 17/124,701

(22) Filed: Dec. 17, 2020

(65) Prior Publication Data

US 2021/0178958 A1     Jun. 17, 2021

(30) Foreign Application Priority Data

Dec. 17, 2019   (EP) ..................................... 19217134

(51) Int. Cl.
*B60P 7/15*     (2006.01)
*B60R 5/00*     (2006.01)

(52) U.S. Cl.
CPC .. *B60P 7/15* (2013.01); *B60R 5/00* (2013.01)

(58) Field of Classification Search
CPC .................................... B60P 7/15; B60P 7/08
USPC ....... 410/149, 8, 143, 152, 90, 91, 129, 144; 248/206.5, 205.2, 205.3, 254, 362, 264, 248/357
See application file for complete search history.

(56) References Cited

U.S. PATENT DOCUMENTS

| 5,281,063 | A | 1/1994 | Austin, III |
| 7,648,318 | B2 * | 1/2010 | Maresh ................ B61D 45/006 410/144 |
| 7,785,051 | B2 * | 8/2010 | Kanczuzewski ... B65D 90/0073 410/152 |
| 8,991,625 | B2 * | 3/2015 | Bucklew ................ A47H 1/022 211/105.3 |
| 10,611,292 | B2 * | 4/2020 | Kanczuzewski .......... B60P 7/15 |
| 2013/0200024 | A1 | 8/2013 | Lindo et al. |

FOREIGN PATENT DOCUMENTS

| DE | 20 2016 101 843 U1 | 6/2016 |
| DE | 20 2019 100 808 U1 | 5/2019 |
| EP | 3 453 569 A1 | 3/2019 |

OTHER PUBLICATIONS

European Patent Office Search Report dated Jun. 9, 2020 for EP Application No. 19217134.6 (5 pp.).

* cited by examiner

*Primary Examiner* — D Glenn Dayoan
*Assistant Examiner* — Sunsurraye Westbrook
(74) *Attorney, Agent, or Firm* — Shook, Hardy & Bacon, LLP

(57) ABSTRACT

A locking bar may include one or more of the following: at least two tube sections which are telescopically arranged in the longitudinal direction of the locking bar; at least two connection elements which are arranged at respective ends of the locking bar and are configured for being received into a holding element; at least one spring element; and a first bar part and a second bar part that are arranged in a manner in which they are rotatable to one another over an angle about their common longitudinal axis, the first bar part including a first tube section of the at least two tube sections and the second bar part including a second tube section of the at least two tube sections, where the spring element is configured such that it applies a torsion force respectively acting on the first and second bar parts.

20 Claims, 5 Drawing Sheets

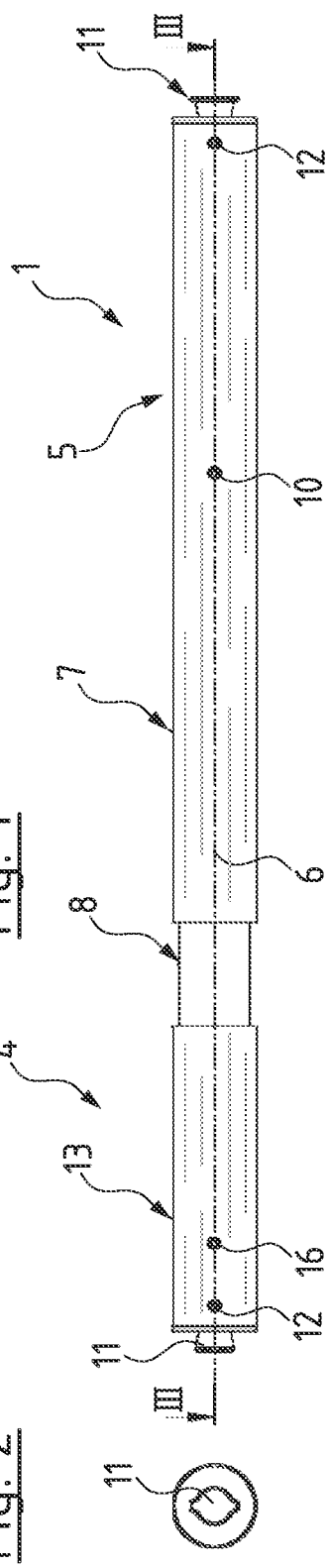
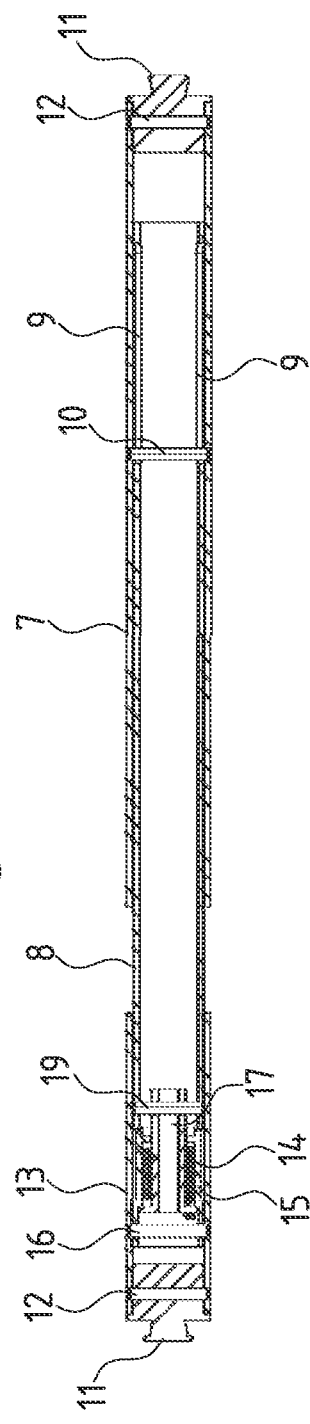
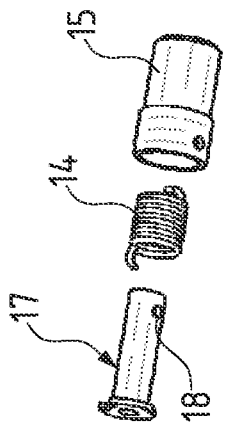

US 11,577,638 B2

LOCKING BAR FOR ARRANGEMENT IN ONE LOAD SPACE OF A VEHICLE

RELATED APPLICATION

This application claims the benefit of, and priority to, European Patent Application No. 19217134.6, filed Dec. 17, 2019, which is incorporated by reference herein in its entirety.

TECHNICAL FIELD

The present disclosure relates to a locking bar for the arrangement in a loading space of a vehicle, said locking bar being provided for the positive integration into two holding elements which are arranged lying opposite one another at the vehicle side.

BACKGROUND locking bars or locking beams are counted as belonging to the state of the art and offered for example by WISTRA GmbH Cargo Control in Selmsdorf under the product description WIS locking bars COMBI-BEAM1811. They typically comprise two bar parts which are arranged in a telescopic manner in the longitudinal direction of the bar and which at their free ends each comprise a connection element which is designed for being received in a holding element. A spring element is arranged between the bar parts and ensures that a force which acts in the direction of the holding element and which arranges the locking bar between the holding elements without play is produced between the connection elements and the holding elements. The holding elements are typically formed in so-called lashing rails which permit the attachment of the locking bars to a multitude of locations in the vehicle.

The arrangement of the connection elements in the holding elements is such that a positive fit between the connection element and the holding element is formed in the direction of loading, which is to say transversely to the locking bar. In order to prevent the connection elements from exiting from the holding elements, a non-positive fit between these components is provided, such a non-positive fit being produced by a spring element which is effective between the bar parts.

However, one disadvantage of existing embodiments is the fact that the clamping force which is necessary for the reliable seating of the connection elements within the holding elements must be overcome when the locking bar is to be inserted, removed or displaced between two holding elements in the loading space. On insertion, the operator must firstly insert the locking bar with a connection element into a holding element and then whilst overcoming the spring force push the bar together to such an extent that the connection element can be arranged on the other side in front of the holding element, into which holding element it then gets after letting go of the locking bar on account of the spring force. Hereby, often very significant forces are to be overcome, so that both hands are necessary, which can be difficult, particularly if the locking bar is to be inserted at a poorly accessible, for example high positions in the loading space.

Against this background, it is the object of certain aspects of the present disclosure to improve a locking bar to such an extent that it is simpler to insert, release and to displace.

BRIEF DESCRIPTION OF THE DRAWINGS

Certain embodiments of the present disclosure are hereinafter explained in more detail by way of embodiment examples which are represented in the drawings. There are shown in:

FIG. 1 is a greatly simplified representation of a plan view of a locking bar according to certain aspects of the present disclosure.

FIG. 2 is a lateral view of the locking bar according to FIG. 1.

FIG. 3 is a section along the section line III-III in FIG. 1.

FIG. 4 is an exploded representation of the spring receiver parts with a spring.

DETAILED DESCRIPTION

Figure 6:
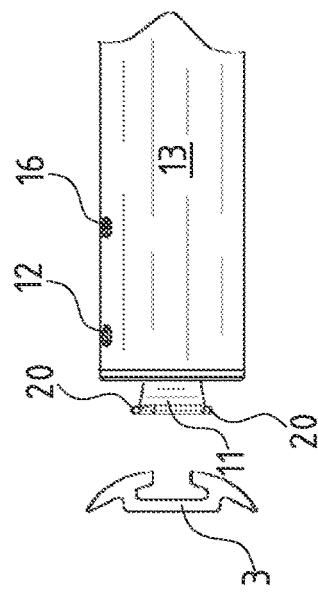
FIGS. 6, 7, 8, and 9 are schematic representations of four positions between the connection element at the locking bar side and the receiver part in the airline rail on fastening the locking bar.

The locking bar for arrangement in a loading space of a vehicle and which is provided for the positive integration into two holding elements which are arranged lying opposite one another at the vehicle side comprises at least two tube sections which are telescopically arranged in the longitudinal direction of the bar. Connection elements which are each designed for being received into a holding element are arranged at the ends of the locking bar. Furthermore, a spring element is provided, said spring element ensuring that after the insertion into the holding elements of the loading space, the connection elements cannot release from the holding elements on their own accord.

Two bar parts are arranged in a manner in which they are rotatable to one another over an angle about their longitudinal axis, wherein the spring element is designed as a rotary spring element and is arranged such that it can produce a torsion force which acts between the bar parts.

Certain embodiments therefore have the locking bar such that this is not secured in the holding elements against an unintended coming-out by way of a spring force which acts in the longitudinal direction of the bar, but by a torsion spring force which acts between the bar parts. The locking bar may therefore be telescopic, but is freely movable and not subjected to force in the telescoping direction and in the counter-direction. Instead, two bar parts which connect to one another in the longitudinal direction of the bar are arranged rotatable to one another over an angle about their longitudinal axis, wherein the spring element is designed and arranged such that it produces a torsion force which acts between the bar parts.

Such a design has the advantage that the locking bar is significantly better with regard to assembly, disassembly and displacement in operation than is possible with locking bars according to the state of the art. The integration is effected with a non-positive fit by way of a torsion force which is exerted upon the connection element and which rotates the connection element about the longitudinal axis about a certain angle when it is integrated in the holding element, so that it is also positively held in the longitudinal direction of the bar. The necessary non-positive fit which prevents the connection element from rotating with respect to the holding element is produced by the torsion spring which is formed by a correspondingly designed and arranged spring element.

The operator can therefore push the locking bar together and pull it apart without any special force effort and thus adapt it in its length. For inserting the locking bar, firstly a connection element is inserted at one end into a desired holding element, whereupon the other holding element is rotated about the longitudinal axis of the locking bar about a certain angle, for example 45 degrees, counter to the force of the spring element and is then pushed into the holding element by way of the locking bar being telescoped further in the direction of its longitudinal axis. If this connection element which is loaded by the spring force is then let go of, it is rotated about a certain angle, for example 20 degrees, by way of the force of the spring, so that it is also positively secured in the longitudinal direction of the bar. The torsion force of the spring element continues to be effective, so that the connection element cannot accidentally release from the holding element.

A holding element within another aspect of this disclosure may be understood as a receiver for a connection element, said receiver positively holding this connection element in particular in the transverse direction to the locking bar and in which the connection element is non-positively secured in the connection element against an unintended removal. Holding elements can be arranged in the base, in the ceiling or in the side walls of the loading space and are typically formed by lashing rails which represent a multitude of holding elements which are arranged next to one another.

A connection element may be a complementary element which is adapted in shape and size to the holding element. Such systems consisting of connection elements at the ends of a locking bar and of holding elements in the form of lashing rails are counted as belonging to the state of the art in various embodiments and are yet to be explained further below by way of example.

Bar parts in the context of the present disclosure are not necessarily to be understood as the tubular bar parts, but here can be understood as arbitrary bar parts, for example a connection element with respect to the remaining locking bar or halves of a locking bar. The distance of the connection elements on the locking bar can be changed and the connection elements are arranged in a manner in which they can be rotated to one another over an angle about the longitudinal axis of the locking bar.

Basically, a spring element can consist of one or more springs which are arranged such that they effect a torsion force between the bar parts. However, it is particularly advantageous to design the spring element itself as a torsion spring, since this permits a simple design of the locking bar.

Basically, one can use torsion springs of a differing construction type, for example torsion bar springs. However, for the present application it is particularly advantages if the torsion spring is formed by a helical spring whose middle longitudinal axis is arranged parallel to the middle longitudinal axis of the locking bar, preferably coincides with this. Herein, the arrangement of the torsion spring is advantageously such that this is completely integrated into the locking bar, is thus neither visible nor accessible for the outside, so that not only does an optically pleasing overall impression arise, but the danger of injury or snagging on the spring element are ruled out.

Tube sections may also be understood as tubes which do not fully envelope their inner volume, such as for example tubes with recesses in the tube wall or tubes which have a U-shaped cross section, thus are open at one side.

Basically, the non-positive fit on incorporating the locking bar into the holding elements in the loading space is not absolutely necessary if the design is such that a positive securing exists in all directions and this can only lifted by way of overcoming the spring force. As a rule however, even with such a design, a non-positive fit s desirable already for the reason of a play-free integration which does not rattle during travel.

The locking bar advantageously comprises two tube sections which are telescopable into one another and which are preferably arranged in a manner in which they a limitedly movable to one another in the direction of their longitudinal axis by way of positive-fit elements. Advantageously, two elongate holes which extend in the longitudinal direction and through which a transverse pin which is fixed in the other tube section passes are provided in one tube section. The two tube sections are then captively connected to one another and can be telescoped, so that the locking bar is changeable in its length by way of a simple displacement of the tube sections to one another.

Diametrically opposite elongate holes are advantageously provided in the inner tube section and the transverse pin which passes through these is fixed with its ends in bores of the surrounding outer tube section.

Advantageously, a connection element is attached to the outer tube section at its outwardly directed end. This can be fastened in the same manner with the help of a transverse pin and bores, and a modular construction then arises, with regard to which different connection elements can be applied depending on the used lashing rail system, so that these connection elements are preferably arranged in an exchangeable manner, so that a locking bar can also be retrofitted to another lashing rail system.

It is particularly advantageous if the inner tube section is connected to a further outer tube section at its end which is away from the outer tube section, into which further outer tube section it then immerses and at the outer end of said outer tube section a connection element which is preferably likewise exchangeable is arranged. Such a design has the advantage that the locking bar at the end side is provided on the one hand with the outer tube section and on the other hand with the further outer tube section which preferably have the same diameter dimensions and wall thickness dimensions, so that constructionally identical connection elements can be used.

As has been initially mentioned, the location at which the locking bar is interrupted such that two bar parts are rotatable to one another about a certain angle is basically arbitrary. However, it is particularly advantageous if this rotary joint is formed in the region between the inner tube section and the further outer tube section, which means if the inner tube section and the further outer tube section are rigid in the direction of their longitudinal axis and are connected in a limitedly movable manner in the direction about their longitudinal axis. The telescopic ability of the locking bar then results by way of the longitudinal movement between the inner tube section and the outer tube section and the rotation ability by way of the rotary movement between the inner tube section and the further outer tube section.

The arrangement of the spring element within the locking bar is advantageously effected via an at least two-part spring receiver, with regard to which a first receiver part is connected to one end of the spring and a second receiver part to the other end of the spring such that torsion forces can be transmitted. Herein, it is advantageous for the first receiver part to be connected in a rotationally fixed manner to the further outer tube section and for the second receiver part to be connected in a rotationally fixed manner to the inner tube section, so that these torsion forces of the spring are transmitted onto load-bearing parts of the locking bar. Herein, it is advantageous for the first receiver part to be designed in a tubular manner, in order to receive the spring and to surround it to the outside in a guided and protected manner. According to an advantageous further embodiment, this first receiver part is arranged within the further outer tube section and is fixedly connected to this.

The second receiver part can likewise be designed in a tubular manner. Independently of whether this is then designed as a hollow part or of a solid material, it advantageously comprises a cylindrical section which guides and passes through the spring at its inner periphery.

Advantageously, the second receiver part at one end, at least in one rotation direction about the middle longitudinal axis is positively connected to the spring, wherein the second receiver part passes through the first receiver part and the passing-through end of the second receiver part is connected to the inner tube section at least in a rotationally fixed manner, preferably however in a fixed manner. Such a design is particularly advantageous since the helical spring is arranged in a protected manner between the first and the second receiver part, at its ends is each connected in a rotationally fixed manner to one of the receiver parts and the receiver parts themselves are connected to the respective tube sections in a fixed and hence also rotationally fixed manner. An inexpensive and stable construction which is also advantageous with regard to the assembly therefore results.

Herein, the dimensioning of the receiver parts is advantageously such that the passing-through end of the second receiver part immerses into the inner tube section and there is fixedly connected to this tube section by way of a transverse pin.

With regard to the locking bar which is represented by way of FIGS. 1 to 9, it is the case of a telescopic locking bar 1 with end-side connection elements 11 for being received in holding elements 2 as are formed by way of an airline rail 3. Such airline rails 2 are arranged for example in opposite side walls of a loading space of a vehicle and given a perpendicular arrangement of the rail permit an arrangement of the locking bar at different heights and given an horizontal arrangement of the rails permit an arrangement of the locking bar at different locations in the longitudinal direction of the loading space.

As can be particularly derived from FIGS. 1 and 3, the locking bar 1 is formed from two bar parts, specifically in the figures from a left bar part 4 and a right bar part 5 which are arranged rotatable to one another about a middle longitudinal axis 6 of the locking bar.

The bar part 5 comprises an outer tube section 7, in which an inner tube section 8 can be telescoped, which is to say is arranged in a adjustable manner in the longitudinal direction of the locking bar. The inner tube section 8 comprises two elongate holes 9 which are arranged parallel to the middle longitudinal axis 6 and through which a transverse pin 10 passes, said transverse pin being fixed in the outer tube section 7, so that the inner tube section 8 is captively connected to the outer tube section 7 and can be telescoped in a limited manner in accordance with the length of the elongate holes 9. A connection element 11 which here is designed by way of a connection head for the connection into a holding element 2 11 of an airline rail 3 is fastened to the free outer end of the outer tube section 7. This connection element 11 is arranged at the end of a cylindrically stepped component which is inserted into the free end of the outer tube section 7 and is fixed there by way of a transverse pin 12.

The inner tube section 8 with its end which is at the right in the FIGS. 1 and 3 immerses into the outer tube section 7 and with its other left end immerses into a further outer tube section 13. This further tube section 13 has the same cross-sectional dimensions as the outer tube section 7, but in the longitudinal direction of the middle longitudinal axis 6 is rigidly connected to the inner tube section 8, but is arranged in a rotatable manner to the tube section 8 about the longitudinal axis 6. In the same manner as at the free end of the other tube section 7, a connection element 11 is fixed at the other end of the further outer tube section 13, likewise with a transverse pin 12.

The further outer tube section 13 however is not freely rotatable on the tube inner section 8, but in a limited manner and only in one direction, counter to the spring force of a helical spring 14 which is designed as a torsion spring and in the counter direction with this spring force. The helical spring 14 is arranged in a spring receiver which comprises a first sleeve-like receiver part 15 which is designed in a tubular manner and is fixedly connected to the further outer tube section 13 by way of a transverse pin 16. This first receiver part 15 surrounds the helical spring 14 over the complete periphery. The end of the helical spring which is at the right in FIG. 6 is arranged within the receiver part 15 in a rotationally fixed manner.

A second receiver part 17 is provided and this comprises a cylindrical section, through which the helical spring 14 passes and which guides this at the inner side. This second receiver part 17 comprises a flange-like end which comprises a recess, in which the other end of the helical spring 14 is arranged in a rotationally fixed manner. This second receiver part 17 in the installed position passes through the first receiver part 15, wherein the helical spring 14 is arranged in the annular space which is formed therebetween.

In the installed position, the free end of the second receiver part 17 projects beyond the first receiver part 15. A transverse bore 18 which is fixedly connected to the inner tube section 8 by way of a transverse pin 19 is provided in the projecting part. In this manner, all components including the spring 14 and the spring receiver parts 15 and 17 are positively received within the further outer tube section 13. Not only is the second receiver part 17 connected to the inner tube section 8 in a rotatably fixed manner by way of the transverse pin 19 but also to the further outer tube section 13.

The thus formed locking bar 1 can be changed in its length quasi without force by way of telescoping the tube sections 7 and 8. By way of twisting the further outer tube section 13 with respect to the inner tube section 8, the connection elements 11 can be rotated in their angular position to one another with respect to the longitudinal middle axis 6, counter to the spring force.

Figure 7:
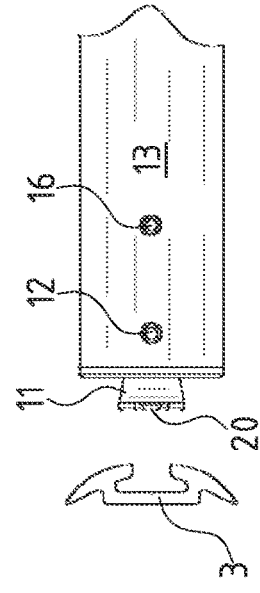
Figure 8:
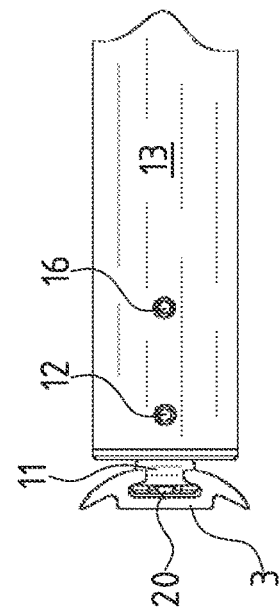
Figure 9:
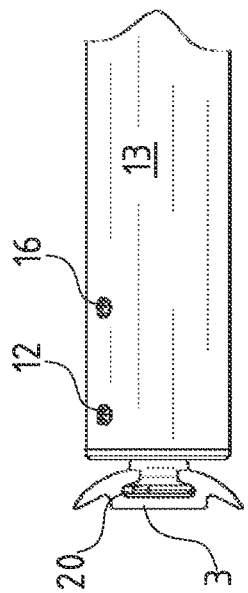
Figure 5:
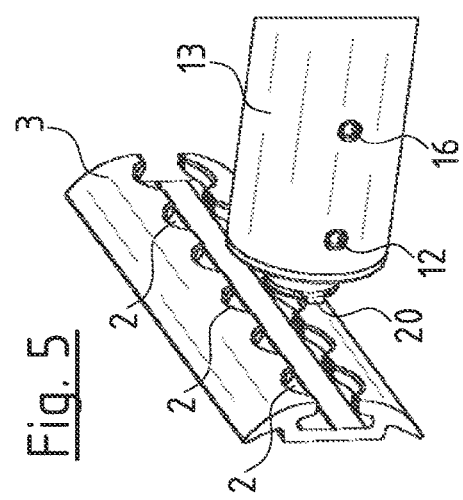
FIG. 5 is a schematic, perspective representation of an arrangement of an airline rail with an end of a locking bar.

If such a locking bar 1 with a connection element 11 which is provided for an airline rail 3 is now to be integrated into a loading space, then firstly a connection element 11, for example the end which is at the right in the FIGS. 1 and 3, is stuck into an airline rail 3 at one side of the loading space, whereupon the locking bar is telescoped until the other end which here is at the left in the FIGS. 1 and 3 has reached the respective opposite holding element 2 of the airline rail 3. This position is represented in FIG. 6. In order to be able to insert the connection element into the holding element 2 of the airline rail 3, the projections 20 must be aligned such that they are arranged in the direction of the longitudinal recess of the rail. It is therefore the end of the locking bar which is at the left in the FIGS. 1 and 3, thus the further outer tube section 13 which is to be gripped by the hand and rotated counter to the force of the helical spring 14 such that the projections 20 are arranged in the direction of the continuous groove in the rail 3, as is represented in FIG. 7. In this position, this left end of the locking bar is then to be telescoped further until the connection element 11 is completely incorporated into the holding element 2 which is to say to the base of the airline rail 3. This position is represented in FIG. 8. The telescoping can herein be effected in a practically force-free manner, since it is merely the inner tube section 8 which is to be displaced in the longitudinal direction with respect to the outer tube section 7.

If now in the position of the locking bar 1 which is represented in FIG. 8, in particular the further outer tube section 13 around which the hand still grips is let go of, then this part of the locking bar 1 rotates, thus the further tube section 13 rotates with respect to the inner tube section 8 by way of the force of the torsion helical spring 14 until the projections 20 of the connection element 11 bear within the rail 3 and the connection element 11 is therefore positively fixed. This is supported by the connecting element 11 which is arranged in the direction of rotation opposite to the connecting element 11 at the other end in the retaining element 2. The release is effected in the reverse sequence.

Figure 10:
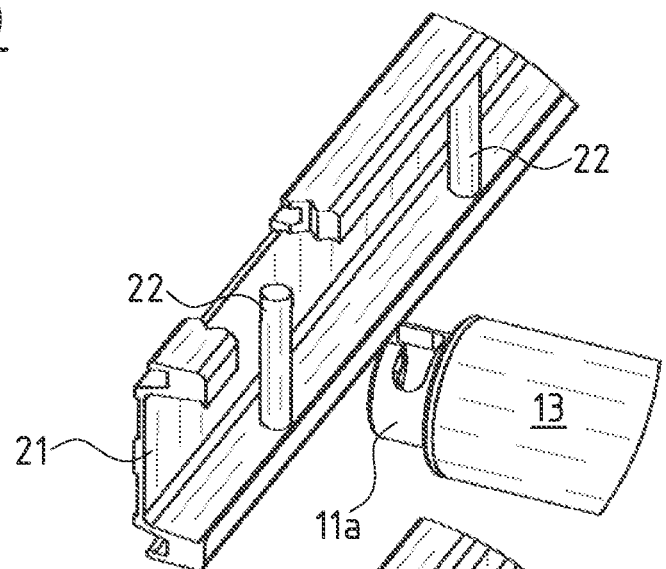
FIGS. 10, 11 and 12 are simplified perspective representations of the fastening of a connection element of a locking bar to a holding element which is provided with transverse rods.
Figure 11:
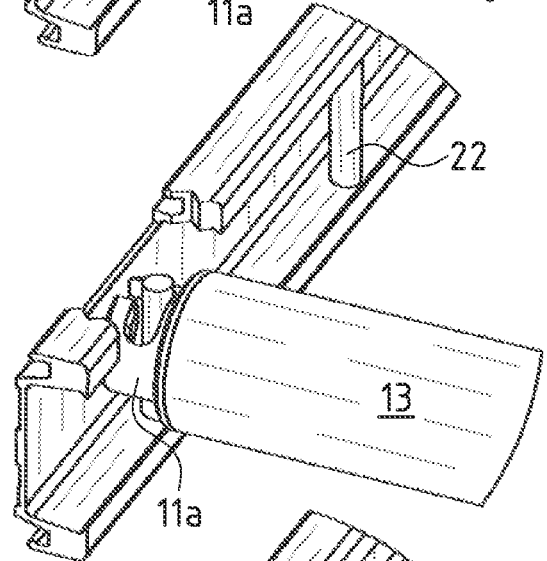
Figure 12:
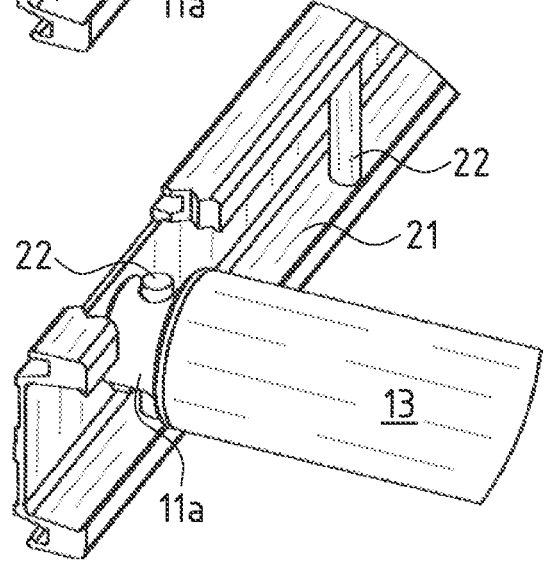

The fixing of a locking bar is described by way of FIGS. 10 to 12, wherein its connection element 11a in the manner of a bayonet engages into a U-shaped rail 21 which is provided with web-parallel rodlets 22 which are positively embraced by the bayonet of the connection element 11. Here too, it is clearly visible that firstly by way of rotating a tube end, the bayonet is brought into the position in which it can be inserted into the rail 21 in a manner engaging around a rodlet 22, so that the locking bar is then telescoped and the connection element 11a is inserted so far into the rail that the rodlet 22 is embraced. If now this end of the locking bar is let go of, then this rotates due to the spring force, in a manner such that a complete positive securing is effected, this only being able to be released by way of rotating in the opposite direction. Such a rotation however can only be effected counter to the force of the spring 14 which therefore ensures a securing in this position.

Figure 13:
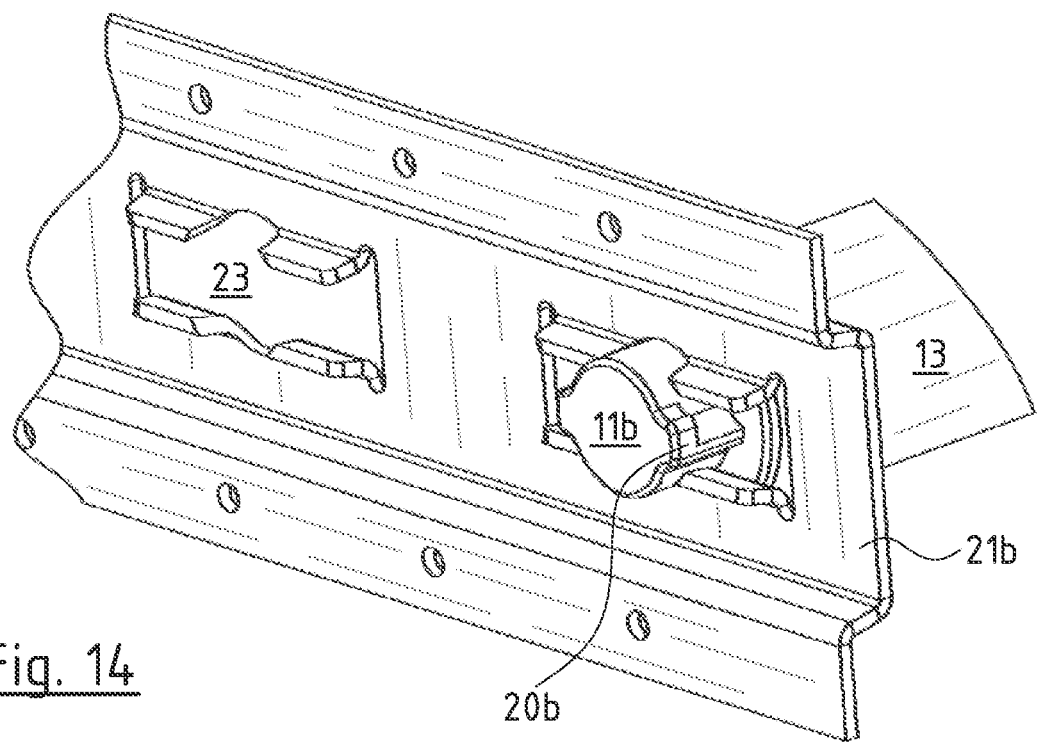
FIGS. 13 and 14 show representations where a locking bar is inserted or locked by way of rotation of a connection element within the holding element of an anchor combi-rail.
Figure 14:
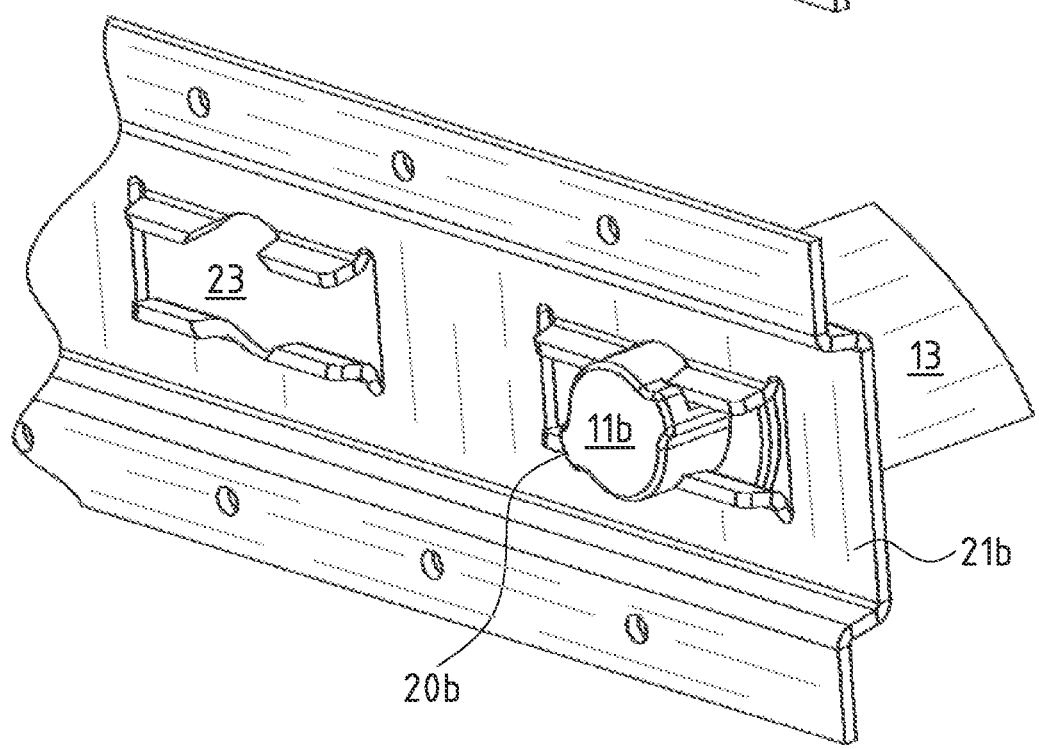

By way of FIGS. 13 and 14, it is shown how a connection element 11b which has a cylindrical shape with radial projections 20b can be incorporated into a corresponding holed rail 21b which comprises recesses 23 which are designed with an essentially longitudinally extended rectangular shape with a central, circularly round recess which projects beyond the rectangular recess. The cylindrical connection element as is shown in FIG. 13 can only pass through such a recess 23 if the projections 20b are arranged such that they can get through the free space of the rectangular recess which is formed next to the circularly round bore. If the further outer tube section 13 is then let go of and the connection element 11b is rotated about the longitudinal axis of the locking bar by way of the spring force of the spring 14, then these projections 20b get behind the sides of this recess 23 and hence secure the connection element 11b against a withdrawal out of the recess 23.

Figure 15:
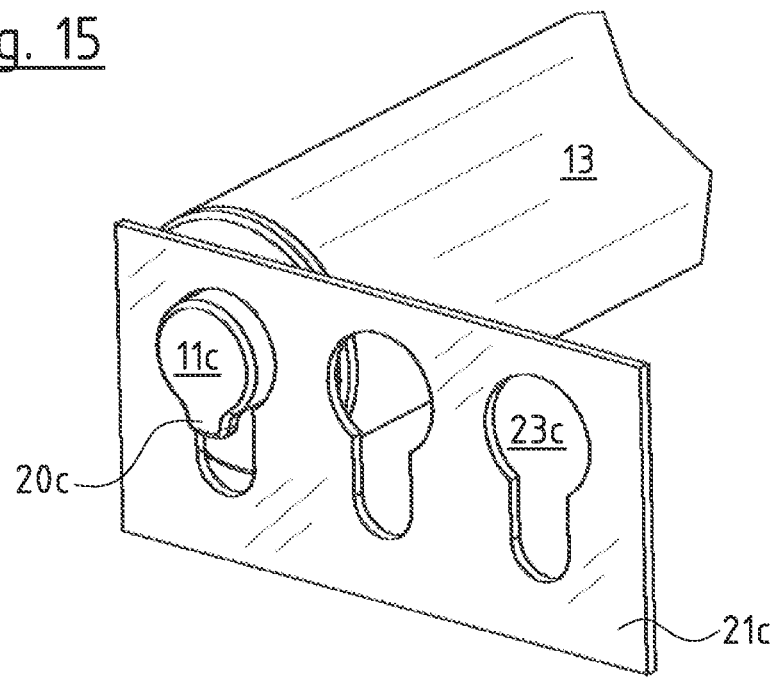
FIGS. 15 and 16 show comparable positions of a connection element in a keyhole rail.
Figure 16:
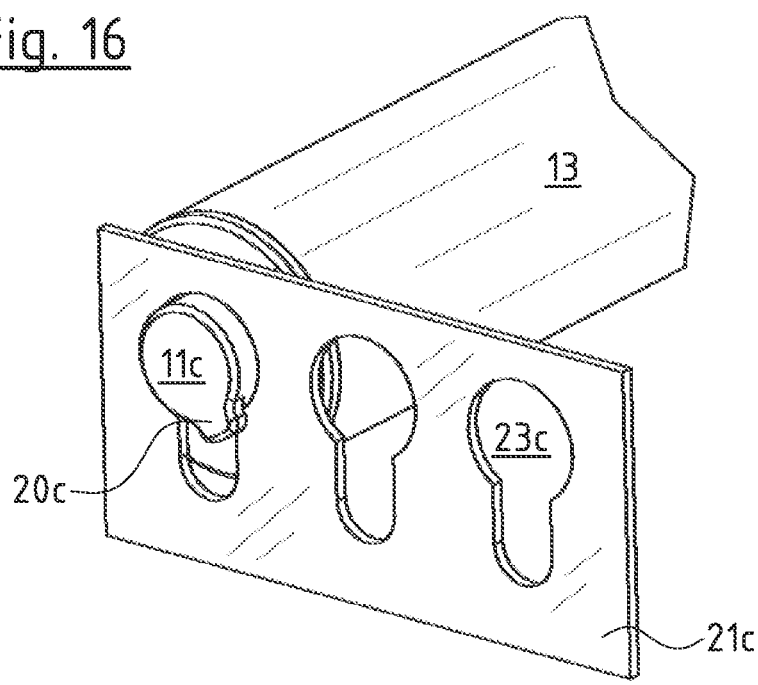

By way of FIGS. 15 and 16, it is shown how a connection element 11c in a rail is fixed in an analogous manner with keyhole-like recesses 23c in a rail 21c. There the connection element 11c comprises a projection 20c which by way of rotating back the connection element 11c together with the further outer tube section 13 prevents the locking bar from falling out or being pulled out of the keyhole-shaped recess 23c.

For the sake of completeness, it is to be noted that concerning the embodiments as are represented on the one hand by way of FIGS. 13 and 14 and on the other hand FIGS. 15 and 16, basically a non-positive fit can be forgone if the pivoting ability is limited and is held in the closure position by way of spring force. However, a non-positive fit as a rule is desirable so as to prevent a rattling of the components.

LIST OF REFERENCE NUMERALS

1 locking bar
2 holding element
3 airline rail
4 bar part left
5 bar part right
6 middle longitudinal axis
7 outer tube section
8 inner tube section
9 elongate holes
10 transverse pin
11 connection element
11a connection element in the FIGS. 10 to 12
11b connection element in the FIGS. 13 to 14
11c connection element in the FIGS. 15 to 16
12 transverse pin
13 further outer tube section (left)
14 helical spring, torsion spring
15 first receiver part
16 transverse pin
17 second receiver part
18 transverse bore
19 transverse pin
20 projections
20b projections of 11b
20c projections of 11c
21 rail in the FIGS. 10 to 12
21b rail in the FIGS. 13 and 14
21c rail in the FIGS. 15 and 16
22 rodlet
23 recess
23c recesses in the FIGS. 15 and 16

I claim:

1. A locking bar for the arrangement in a loading space of a vehicle,
   wherein the locking bar is configured for the positive integration into two holding elements which are arranged lying opposite one another at a vehicle side, the locking bar comprising:
   at least two tube sections which are telescopically arranged in the longitudinal direction of the locking bar;
   at least two connection elements which are arranged at respective ends of the locking bar and are configured for being received into a holding element;
   at least one spring element; and
   a first bar part and a second bar part that are arranged in a manner in which they are rotatable to one another over an angle about their common longitudinal axis, the first bar part including a first tube section of the at least two tube sections and the second bar part including a second tube section of the at least two tube sections, wherein the spring element is configured such that it applies a torsion force respectively acting on the first and second bar parts.

2. The locking bar of claim 1, wherein the spring element is a torsion spring.

3. The locking bar of claim 1, wherein torsion spring is formed by a helical spring with a middle longitudinal axis arranged parallel to the middle longitudinal axis of the locking bar.

4. The locking bar of claim 1, wherein the first and second tube sections are arranged in a manner in which they are limitedly movable relative to one another in the direction of their longitudinal axis by way of positive-fit elements.

5. The locking bar of claim 4, wherein the positive-fit elements are formed by at least one elongate hole in one tube section and a transverse pin which is guided therein and which is fixed in the other tube section.

6. The locking bar of claim 1, wherein the first tube section of the at least two tube sections includes an exchangeable connection element.

7. The locking bar of claim 1, wherein an inner tube section of the at least two tube sections is connected to a first tube section on a first end and the second tube section on an opposite second end.

8. The locking bar of claim 7, wherein the inner tube section and at least one of the first tube section and the second tube section are respectively arranged in a limitedly movable manner in the direction about their longitudinal axis.

9. The locking bar of claim 7, wherein an at least two-part spring receiver is included, wherein a first receiver part is connected to one end of the spring and a second receiver part to the other end of the spring, wherein the first receiver part is connected in a rotationally fixed manner to at least one of the first tube section and the second tube section and the second receiver part is connected in a rotationally fixed manner to the inner tube section.

10. The locking bar of claim 9, wherein the first receiver part includes a tubular structure that at least partially surrounds the spring.

11. The locking bar of claim 9, wherein the first receiver part is arranged within and fixed to at least one of the first tube section and the second tube section.

12. The locking bar of claim 9, wherein the second receiver part comprises a cylindrical section which guides and passes through the spring at its inner periphery.

13. The locking bar of claim 9, wherein the second receiver part is connected to the spring, wherein the second receiver part extends at least partially through the first receiver part, and wherein an end of the second receiver part is connected to the inner tube section in a rotationally-fixed engagement.

14. The locking bar of claim 13, wherein the end of the second receiver part extends into the inner tube section and is fixedly connected to the inner tube section with a transverse pin.

15. A system, comprising:
a locking bar; and
first and second holding elements respectively connected to first and second ends of the locking bar,
the locking bar comprising:
at least two tube sections which are telescopically arranged in the longitudinal direction of the locking bar;
at least two connection elements which are arranged at respective ends of the locking bar and are configured for being received into a holding element;
at least one spring element; and
a first bar part and a second bar part that are arranged in a manner in which they are rotatable to one another over an angle about their common longitudinal axis, the first bar part including a first tube section of the at least two tube sections and the second bar part including a second tube section of the at least two tube sections,
wherein the spring element is configured such that it applies a torsion force respectively acting on the first and second bar parts.

16. The system of claim 15, wherein the spring element is a torsion spring.

17. The system of claim 15, wherein torsion spring is formed by a helical spring with a middle longitudinal axis arranged parallel to the middle longitudinal axis of the locking bar.

18. The system of claim 15, wherein the first and second tube sections are arranged in a manner in which they are limitedly movable relative to one another in the direction of their longitudinal axis by way of positive-fit elements.

19. The system of claim 18, wherein the positive-fit elements are formed by at least one elongate hole in one tube section and a transverse pin which is guided therein and which is fixed in the other tube section.

20. The system of claim 15, wherein the first tube section of the at least two tube sections includes an exchangeable connection element.

* * * * *